(12) United States Patent
Seo et al.

(10) Patent No.: US 11,455,005 B2
(45) Date of Patent: Sep. 27, 2022

(54) DISPLAY DEVICE

(71) Applicant: Samsung Display Co., LTD., Yongin-si (KR)

(72) Inventors: Dongwoo Seo, Suwon-si (KR); Dongjin Park, Seongnam-si (KR); Jaiku Shin, Hwaseong-si (KR); Sung Chul Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/198,874

(22) Filed: Mar. 11, 2021

(65) Prior Publication Data

US 2021/0397218 A1 Dec. 23, 2021

(30) Foreign Application Priority Data

Jun. 22, 2020 (KR) .................. 10-2020-0075723

(51) Int. Cl.
*G06F 1/16* (2006.01)
(52) U.S. Cl.
CPC .................. *G06F 1/1616* (2013.01)
(58) Field of Classification Search
CPC combination set(s) only.
See application file for complete search history.

(56) References Cited

U.S. PATENT DOCUMENTS

| | | | | |
|---|---|---|---|---|
| 10,515,570 B2* | 12/2019 | Ha | .................. | G09F 9/301 |
| 10,593,737 B2* | 3/2020 | Bok | .................. | G06F 3/0443 |
| 10,707,280 B2* | 7/2020 | Jeong | .................. | H01L 27/3223 |
| 11,096,293 B2* | 8/2021 | Park | .................. | G02F 1/133305 |
| 11,158,684 B2* | 10/2021 | Lee | .................. | H01L 51/5012 |
| 2017/0062742 A1* | 3/2017 | Kim | .................. | H01L 51/5253 |
| 2019/0334114 A1 | 10/2019 | Park | | |
| 2020/0073441 A1* | 3/2020 | Shin | .................. | G06F 1/1643 |
| 2020/0137900 A1* | 4/2020 | Park | .................. | G02F 1/13452 |
| 2020/0333845 A1* | 10/2020 | Yug | .................. | G06F 1/1641 |
| 2021/0141124 A1 | 5/2021 | Park et al. | | |
| 2021/0280643 A1* | 9/2021 | Park | .................. | H01L 51/0097 |

(Continued)

FOREIGN PATENT DOCUMENTS

| KR | 10-2019-0124844 | 11/2019 |
|---|---|---|
| KR | 10-2021-0056484 | 5/2021 |

*Primary Examiner* — Lisa Lea-Edmonds
(74) *Attorney, Agent, or Firm* — Kile Park Reed & Houtteman PLLC

(57) ABSTRACT

A display device includes a display module including a folding area and a non-folding area, an impact absorbing layer disposed under the display module and including a bending area and a non-bending area, and a support layer disposed under the impact absorbing layer and including a first sub-support layer overlapping a first non-folding area and a second sub-support layer spaced apart from the first sub-support layer and overlapping a second non-folding area. The first sub-support layer includes a first opening group formed through the first sub-support layer and spaced apart from a first cross-section surface adjacent to the second sub-support layer in a direction opposite to a second direction, and the second sub-support layer includes a second opening group formed through the second sub-support layer and spaced apart from a second cross-section surface adjacent to the first sub-support layer in the second direction.

20 Claims, 12 Drawing Sheets

(56) References Cited

U.S. PATENT DOCUMENTS

| | | | |
|---|---|---|---|
| 2021/0280806 A1* | 9/2021 | Park | B32B 5/18 |
| 2021/0333934 A1* | 10/2021 | Kishimoto | G06F 3/03545 |
| 2021/0375166 A1* | 12/2021 | Park | H01L 51/5281 |
| 2022/0115451 A1* | 4/2022 | Lee | H01L 27/3234 |

* cited by examiner

DISPLAY DEVICE

CROSS-REFERENCE TO RELATED APPLICATION(S)

This U.S. non-provisional patent application claims priority to and the benefit of Korean Patent Application No. 10-2020-0075723 under 35 U.S.C. § 119, filed in the Korean Intellectual Property Office (KIPO) on Jun. 22, 2020, the entire contents of which are incorporated herein by reference.

BACKGROUND

1. Field of Disclosure

The disclosure relates to a display device. More specifically, the disclosure relates to a display device including a support layer through which an opening is formed.

2. Description of the Related Art

A display device displays various images through a display screen to provide a user with information. In general, the display device displays the information in an allocated screen area. In recent years, flexible display devices including a flexible display panel that is foldable are being developed. Different from a rigid display device, the flexible display device is foldable, rollable, or bendable. The flexible display device, which is capable of being transformed into various shapes, is easy to carry and improves a user's convenience.

A folding area of the flexible display device is vulnerable to external impacts, and thus, various research projects for a functional layer that is capable of absorbing or distributing impacts are underway.

SUMMARY

The disclosure provides a display device capable of preventing a support layer from being damaged due to an external impact.

Embodiments of the disclosure provide a display device including a display module including a folding area foldable with respect to a folding axis extending in a first direction, a first non-folding area disposed adjacent to a side of the folding area, and a second non-folding area disposed adjacent to another side of the folding area, an impact absorbing layer disposed under the display module, the impact absorbing layer including a bending area overlapping the folding area, a first non-bending area overlapping the first non-folding area, and a second non-bending area overlapping the second non-folding area, and the second non-bending area including a concave portion to correspond to the bending area, and a support layer disposed under the impact absorbing layer, the support layer including a first sub-support layer overlapping the first non-folding area, and a second sub-support layer spaced apart from the first sub-support layer in a second direction substantially perpendicular to the first direction, and overlapping the second non-folding area. The first sub-support layer may include a first opening group formed through the first sub-support layer and spaced apart from a first cross-section surface adjacent to the second sub-support layer in a direction opposite to the second direction, and the second sub-support layer may include a second opening group formed through the second sub-support layer and spaced apart from a second cross-section surface adjacent to the first sub-support layer in the second direction.

The concave portion has a first width in the second direction, and the first sub-support layer and the second sub-support layer may be spaced apart by a second width smaller than the first width in the second direction.

The first sub-support layer and the second sub-support layer may be symmetrical with each other with respect to the folding axis.

The first sub-support layer may include a first area overlapping the first non-folding area, a second area overlapping the folding area, the second area including the first opening group, and a third area overlapping the folding area and spaced apart from the first area, the second area being disposed between the first and third areas.

The second sub-support layer may include a fourth area overlapping the second non-folding area, a fifth area overlapping the folding area, the fifth area including the second opening group, and a sixth area overlapping the folding area and spaced apart from the fourth area, the fifth area being disposed between the fourth and sixth areas.

Each of the first and second opening groups may include a plurality of sub-opening groups arranged in the second direction and spaced apart from each other.

Each of the plurality of sub-opening groups may include a plurality of openings arranged in the first direction and spaced apart from each other.

Each of the plurality of openings may have a rectangular shape whose long sides are substantially parallel to the first direction in a plan view.

The first sub-support layer and the second sub-support layer may face each other in case that the display device is folded with respect to the folding axis.

The display device further may include a first adhesive layer disposed between the impact absorbing layer and the first sub-support layer, and a second adhesive layer disposed between the impact absorbing layer and the second sub-support layer.

The first adhesive layer and the second adhesive layer may be spaced apart by first width in the second direction.

The display device further includes a filter layer disposed under the support layer.

The filter layer may overlap an entire surface of the concave portion and overlap a portion of the first sub-support layer and a portion of the second sub-support layer.

The filter layer may include a first portion overlapping the first sub-support layer, a second portion overlapping the second sub-support layer, and a third portion connecting the first portion to the second portion.

The first portion of the filter layer and the second portion of the filter layer may face each other in case that the display device is folded with respect to the folding axis, and the third portion may extend to connect the first portion to the second portion.

The display device may further include an auxiliary support layer disposed on the support layer, the auxiliary support layer may overlap an entire surface of the concave portion, and the auxiliary support layer may include a third opening group in an area in which the auxiliary support layer overlaps the concave portion.

The third opening group may include a plurality of third sub-opening groups spaced apart from each other in the second direction.

Each of the third sub-opening group may include a plurality of third openings spaced apart from each other in the first direction.

The display device may further include an adhesive layer disposed between the support layer and the auxiliary support layer.

The adhesive layer may include a third adhesive layer overlapping the first sub-support layer, and a fourth adhesive layer overlapping the second sub-support layer.

The third adhesive layer and the fourth adhesive layer may be spaced apart by a second width in the second direction.

The display device according to an embodiment may include the support layer through which the opening group is partially defined, and thus, the sagging of the display module and the impact absorbing layer, which are disposed above the support layer, and the distortion of the support layer due to the external impact may be prevented.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1A:
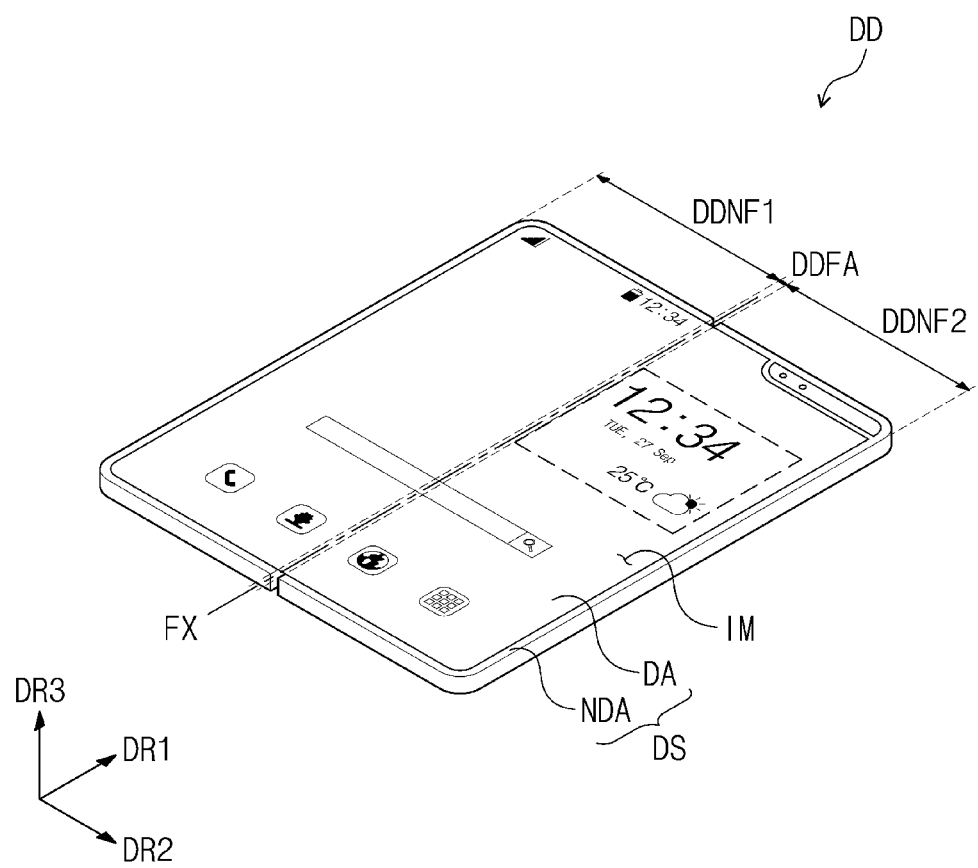
FIG. 1A is a schematic perspective view illustrating a display device according to an embodiment of the disclosure.

The disclosure may be variously modified and realized in many different forms, and thus some embodiments will be exemplified in the drawings and described in detail hereinbelow. However, the disclosure should not be limited to the specific disclosed forms, and be construed to include all modifications, equivalents, or replacements included in the spirit and scope of the disclosure.

In the disclosure, it will be understood that when an element or layer is referred to as being "on," "connected to," or "coupled to" another element or layer, it can be directly on, connected, or coupled to the other element or layer or intervening elements or layers may be present.

Like numerals refer to like elements throughout. In the drawings, the thickness, ratio, and dimension of components may be exaggerated for effective description of the technical content.

As used herein, the term "and/or" includes any and all combinations of one or more of the associated listed items.

It will be understood that, although the terms first, second, and the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a," "an," and "the" are intended to include the plural forms as well, unless the context clearly indicates otherwise.

Spatially relative terms, such as "beneath," "below," "lower," "above," "upper," and the like, may be used herein for ease of description to describe one element or feature's relationship to another element(s) or feature(s) as illustrated in the figures.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and will not be interpreted in an ideal or excessively formal sense unless clearly so defined herein.

It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, the disclosure will be explained in detail with reference to the accompanying drawings.

Figure 1B:
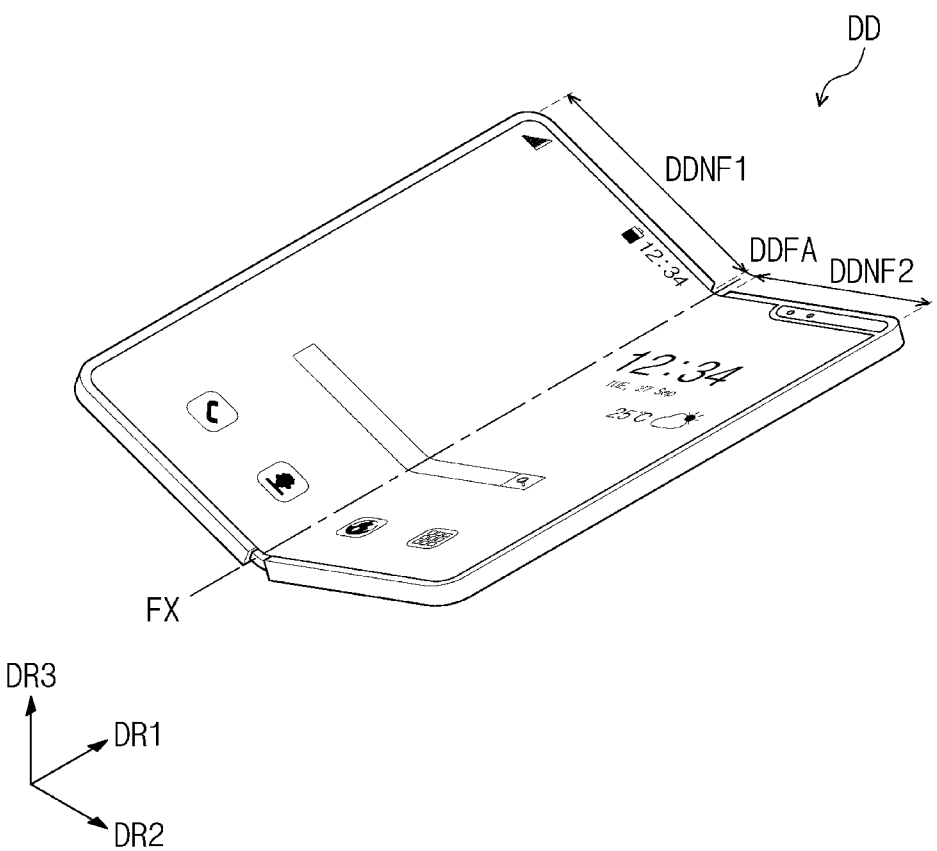
FIG. 1B is a schematic perspective view illustrating a display device according to an embodiment of the disclosure.

FIG. 1A is a schematic perspective view illustrating a display device DD according to an embodiment. FIG. 1B is a schematic perspective view illustrating an operation of the display device DD according to an embodiment.

Referring to FIGS. 1A and 1B, the display device DD may be activated in response to electrical signals applied thereto. The display device DD may be a mobile phone, a tablet computer, a car navigation system, a game console, or a wearable device, but, the disclosure is not limited thereto. FIGS. 1A and 1B illustrate a mobile phone as an example display device DD.

The display device DD may be a foldable display device folded about a folding axis FX extending in a first direction DR1. The display device DD may include a first non-folding area DDNF1, a folding area DDFA, and a second non-folding area DDNF2, which are defined therein and sequentially arranged in a second direction DR2 intersecting the first direction DR1. For example, the display device DD may include the folding area DDFA folded about the folding axis FX extending in the first direction DR1, the first non-folding area DDNF1 disposed adjacent to one side of the folding area DDFA, and the second non-folding area DDNF2 disposed adjacent to another side of the folding area DDFA. FIGS. 1A and 1B illustrate a folding area DDFA and first and second non-folding areas DDNF1 and DDNF2, but the number of the folding areas DDFA and the number of the non-folding areas are not limited thereto or thereby. For example, the display device DD may include three or more non-folding areas and folding areas disposed between the non-folding areas.

The display device may include a display surface DS that includes an active area DA and a non-active area NDA. The display device DD may display an image IM through the active area DA. In case that the display device DD is in a non-folded state, the active area DA may include a layer substantially parallel to a plane defined by the first direction DR1 and the second direction DR2. A thickness direction of the display device DD may be substantially parallel to a third direction DR3 intersecting the first and second directions DR1 and DR2. Accordingly, front (or upper) and rear (or lower) surfaces of each member of the display device DD may be defined in the third direction DR3.

In case that the display device DD is folded, a display surface of the first non-folding area DDNF1 and a display surface of the second non-folding area DDNF2 may face each other. Accordingly, the active area DA may not be exposed to the outside in case that the display device DD is fully folded. This state may be called an in-folded state, however, this is merely an example. The disclosure is not limited thereto.

Figure 2:
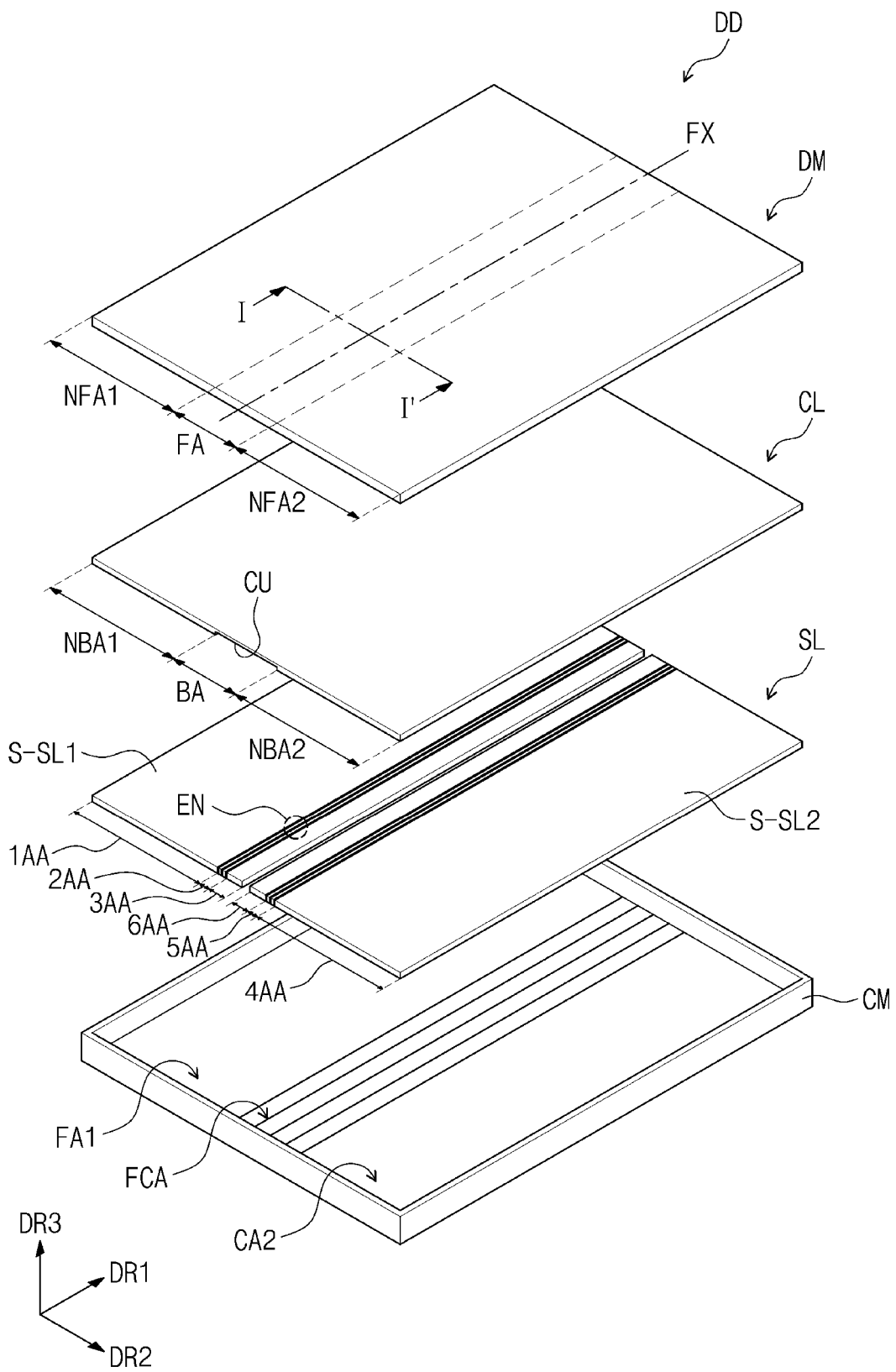
FIG. 2 is a schematic exploded perspective view illustrating a display device according to an embodiment of the disclosure.

FIG. 2 is a schematic exploded perspective view illustrating the display device DD according to an embodiment.

Referring to FIG. 2, the display device DD may include a display module DM, an impact absorbing layer CL, a support layer SL, and a case module CM.

The display module DM may display the image IM (refer to FIG. 1A) and sense an external input. The external input may be a user's input. The display module DM may sense the external input applied to a side surface or a rear surface of the display device DD according to a structure of the display device DD.

Although not illustrated in figures, the display module DM may include a display panel generating images and an input sensing layer (not shown) obtaining coordinate information of the external input. The display panel may be a light-emitting type display panel, however, it is not particularly limited. For instance, the display panel may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod.

The input sensing layer may be disposed directly on the display panel. For example, the input sensing layer may be formed directly on the display panel through successive processes. The input sensing layer may include insulating layers and conductive layers. The conductive layers may form a sensing electrode that senses the external input, a sensing line connected to the sensing electrode, and a sensing pad connected to the sensing line. The input sensing layer may sense the external input in a mutual capacitance method and/or a self-capacitance method, however, the method of sensing the external input is not limited thereto or thereby.

The display module DM may include a first non-folding area NFA1, a folding area FA, and a second non-folding area NFA2, which are defined therein and sequentially arranged in the second direction DR2. For example, the display module DM may include the folding area FA folded about the folding axis FX extending in the first direction DR1, the first non-folding area NFA1 disposed at one side of the folding area FA, and the second non-folding area NFA2 disposed at another side of the folding area FA, and the folding area FA may be disposed between the first non-folding area NFA1 and the second non-folding area NFA2.

The impact absorbing layer CL may be disposed under the display module DM. The impact absorbing layer CL may support a rear surface of the display module DM and may protect the display module DM from impacts applied to the display module DM from the outside. The impact absorbing layer CL may include a sponge, foam, or urethane resin. The impact absorbing layer CL will be described in detail with reference to FIGS. 4A and 4B.

The support layer SL may be disposed under the impact absorbing layer CL. The support layer SL may support and hold a rear surface of the impact absorbing layer CL. The support layer SL may include at least one of a stainless steel (SUS), a copper alloy, and a graphite, however, this is merely an example, and the disclosure is not limited thereto or thereby. The support layer SL will be described in more detail with reference to FIGS. 4A and 4B.

The case module CM may be disposed at an outermost position of the display device DD and may accommodate components therein. The case module CM may include a bottom surface and a sidewall extending from the bottom surface. The display module DM, the impact absorbing layer CL, the support layer SL, and other electronic modules (not shown) may be accommodated in an inner space defined by the bottom surface and the sidewall. The electronic modules may include a camera, a flash unit, a fingerprint sensor, a battery, and a functional sensor, and the functional sensor may be a proximity sensor, a color density detection sensor, an illuminance sensor, a motion sensor, or a heart rate sensor, however, these are merely an example, and the functional sensor is not limited thereto or thereby. Some of the camera, the flash unit, the fingerprint sensor, the battery, and the functional sensors may be omitted, and other electronic modules may be further used.

The case module CM may include a material having a rigidity relatively greater than that of the display module DM. For example, the case module CM may include a glass, plastic, or metal material or may include frames and/or plates formed of a combination of the glass, plastic, and/or metal material. The case module CM may stably protect the components of the display device DD accommodated in the inner space from the external impacts.

The case module CM may include a first case portion CA1 a second case portion CA2, and a folding case portion FCA. The folding case portion FCA may be disposed between the first case portion CA1 and the second case portion CA2. The folding case portion FCA may have a hinge structure or may include a flexible material.

Figure 3:
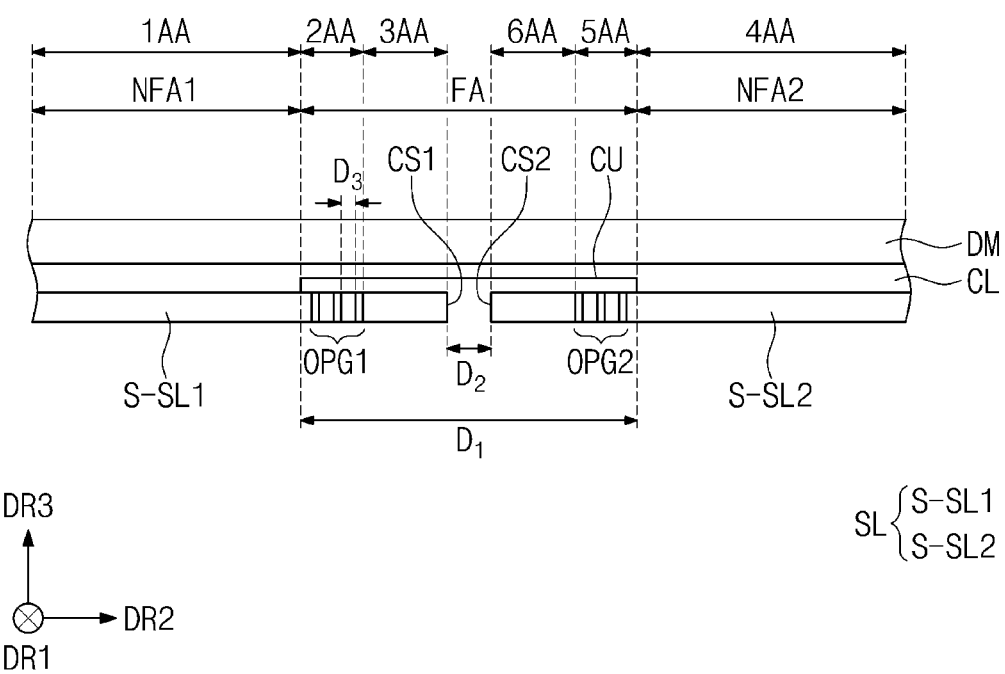
FIG. 3 is a schematic cross-sectional view illustrating a display device according to an embodiment of the disclosure.
Figure 4A:
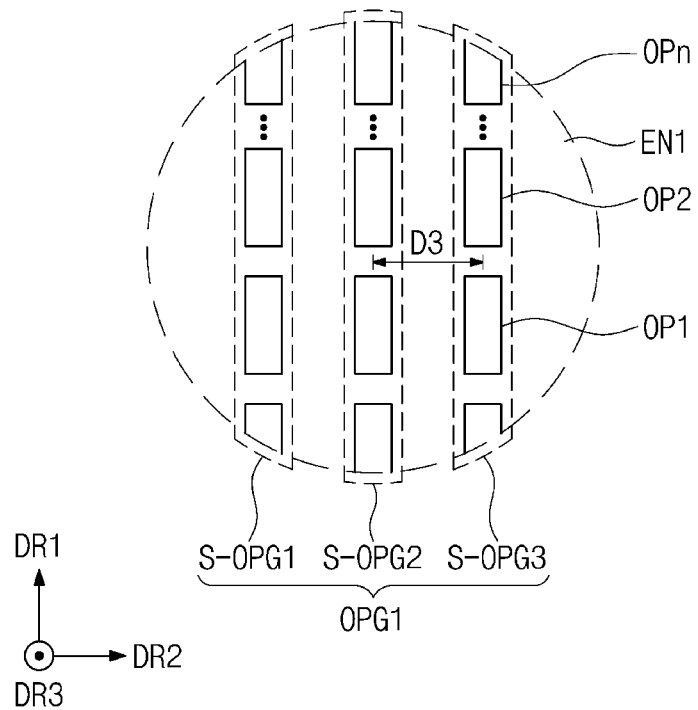
FIG. 4A is a schematic enlarged plan view illustrating a portion of a display device according to an embodiment of the disclosure.
Figure 4B:
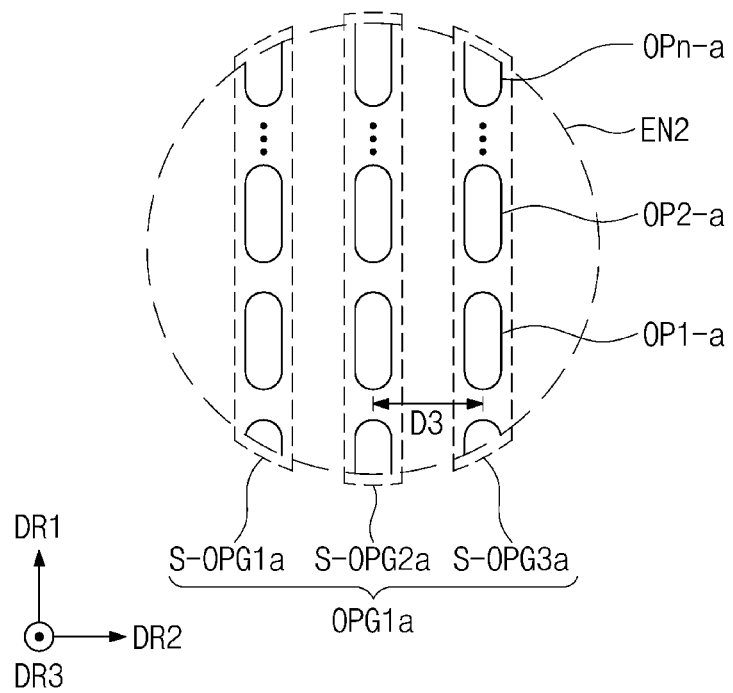
FIG. 4B is a schematic enlarged plan view illustrating a portion of a display device according to an embodiment of the disclosure.

FIG. 3 is a schematic cross-sectional view taken along line I-I' of FIG. 2 to illustrate the display device DD. FIG. 4A is a schematic enlarged plan view illustrating a portion EN of a first sub-support layer illustrated in FIG. 3. FIG. 4B is a schematic enlarged plan view illustrating a portion EN of the first sub-support layer shown in FIG. 3 according to another embodiment. Hereinafter, the display device DD will be described in detail with reference to FIGS. 4A and 4B.

Referring to FIG. 3, the impact absorbing layer CL may include a first non-bending area NBA1, a bending area BA, and a second non-bending area NBA2, which are defined therein and sequentially arranged in the second direction DR2. For example, the bending area BA may be disposed between the first non-bending area NBA1 and the second non-bending area NBA2. The first non-bending area NBA1 may overlap the first non-folding area NFA1, the bending area BA may overlap the folding area FA, and the second non-bending area NBA2 may overlap the second non-folding area NFA2. In case that the display device DD is folded about the folding axis FX, the bending area BA may be bent about the same folding axis FX as the folding area FA.

The impact absorbing layer CL may be provided with (or include) a concave portion CU defined therein and recessed toward the display module DM in the bending area BA. The concave portion CU may have a first width $D_1$ in the second direction DR2. A portion in which the concave portion CU is defined in the impact absorbing layer CL may contact the display module DM disposed thereon without contacting the support layer SL disposed thereunder.

The support layer SL may include a first sub-support layer S-SL1 that overlaps the first non-folding area NFA1 and a portion of the folding area FA, and a second sub-support layer S-SL2 that is spaced apart from the first sub-support layer S-SL1 and overlaps the second non-folding area NFA2 and a portion of the folding area FA. The second sub-support layer S-SL2 may be spaced apart from the first sub-support layer S-SL1 by a second width $D_2$ smaller than the first width $D_1$ in the second direction DR2. The first sub-support layer S-SL1 and the second sub-support layer S-SL2 may be symmetrical with each other with respect to the folding axis FX.

A first opening group OPG1 and a second opening group OPG2 may be defined through the first sub-support layer S-SL1 and the second sub-support layer S-SL2, respectively. The first opening group OPG1 of the first sub-support layer S-SL1 may be spaced apart from a first cross-section surface CS1 of the first sub-support layer S-SL1 adjacent to the second sub-support layer S-SL2 in a direction opposite to the second direction DR2, and the second opening group OPG2 of the second sub-support layer S-SL2 may be spaced apart from a second cross-section surface CS2 of the second sub-support layer S-SL2 adjacent to the first sub-support layer S-SL1 in the second direction DR2. In FIG. 3, the first opening group OPG1 and the second opening group OPG2 may be formed in areas corresponding to the folding area FA, however, this is merely an example, and the disclosure is not limited thereto or thereby. For example, the first opening group OPG1 may overlap the first non-folding area NFA1, or the second opening group OPG2 may overlap the second non-folding area NFA2.

As the first and second opening groups OPG1 and OPG2 are respectively formed through the first and second sub-support layers S-SL1 and S-SL2 to be spaced apart from the first cross-section surface CS1 and the second cross-section surface CS2, a third area 3AA and a sixth area 6AA may be defined.

The first sub-support layer S-SL1 may include a first area 1AA overlapping the first non-folding area NFA1, a second area 2AA overlapping the folding area FA and provided with the first opening group OPG1 defined therein, and the third area 3AA overlapping the folding area FA and spaced apart from the first area 1AA with the second area 2AA interposed therebetween. The second sub-support layer S-SL2 may include a fourth area 4AA overlapping the second non-folding area NFA2, a fifth area 5AA overlapping the folding area FA and provided with the second opening group OPG2 defined therein, and the sixth area 6AA overlapping the folding area FA and spaced apart from the fourth area 4AA with the fifth area 5AA interposed therebetween.

As the support layer SL includes the third area 3AA and the sixth area 6AA in which an opening is not defined, the support layer SL may stably support the impact absorbing layer CL and the display module DM, which are disposed on the support layer SL. For example, a sagging phenomenon of the impact absorbing layer CL and the display module DM may be reduced in the folding area FA, when compared with the case where the opening is defined in the third area 3AA and the sixth area 6AA. Therefore, deformation of the impact absorbing layer CL and the display module DM may be prevented. As a result, reliability with respect to durability of the impact absorbing layer CL and the display module DM may be improved. Since there is no sagging of the display module DM, the user's touch feeling may be improved, and a friction noise generated when the support layer SL collides with other components disposed thereon or thereunder may be reduced.

Referring to FIG. 4A, each of the first opening group OPG1 and the second opening group OPG2 may include sub-opening groups S-OPG1, SOPG-2, and S-OPG3 defined in the second direction DR2 and spaced apart from each other by a third width D3 smaller than the second width D2. The sub-opening groups S-OPG1, SOPG-2, and S-OPG3 may be spaced apart from each other in the second direction DR2 at regular intervals, however, this is merely an example. The sub-opening groups S-OPG1, SOPG-2, and S-OPG3 may be spaced apart from each other in the second direction DR2 at different intervals.

Each of the sub-opening groups S-OPG1, SOPG-2, and S-OPG3 may include openings OP1, OP2, . . . , OPn arranged in the first direction DR1. The openings OP1, OP2, . . . , OPn may be arranged in the first direction DR1 to be spaced apart from each other at regular intervals, however, this is merely an example. The openings OP1, OP2, . . . , OPn may be arranged to be spaced apart from each other at different intervals.

Each of the openings OP1, OP2, . . . , OPn may have a rectangular shape whose sides in the first direction DR1 are long sides, however, this is merely an example. Referring to FIG. 4B, each of openings OP1-a, OP2-a, . . . , OPn-a included in sub-opening groups S-OPG1a, S-OPG2a, and S-OPG3a of the first opening group OPG1a, respectively, may have a shape including a curved part. For example, each of the openings OP1-a, OP2-a, . . . , OPn-a may have an oval shape in which sides in the first direction DR1 may be straight, and sides in the second direction DR2 may be curved. However, the shape of the openings OP1-a, OP2-a, . . . , OPn-a is not particularly limited as long as the external impacts are reduced.

Figure 5A:
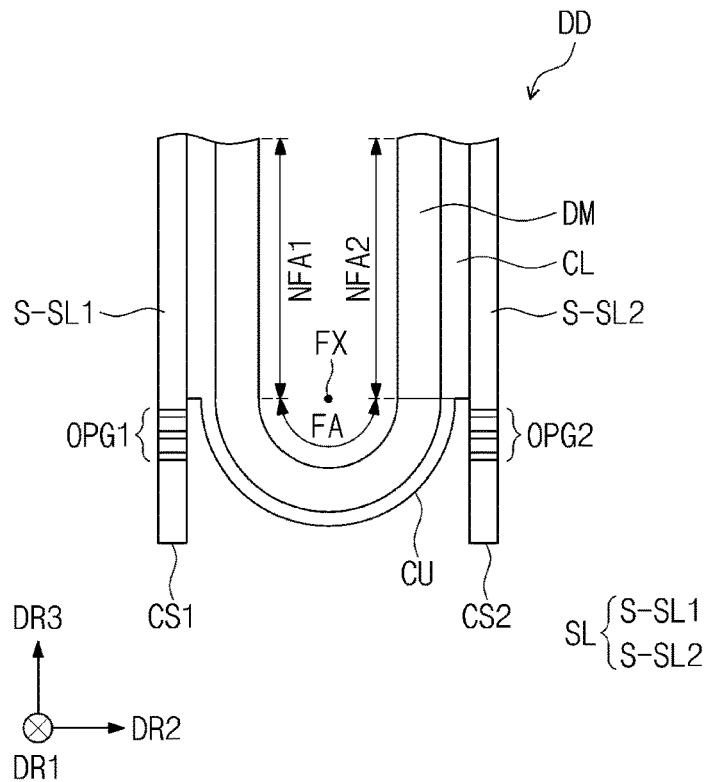
FIG. 5A is a schematic cross-sectional view illustrating a folded display device according to an embodiment of the disclosure.

FIG. 5A is a schematic cross-sectional view illustrating a folded display device DD according to an embodiment. FIG.

5B is a schematic cross-sectional view illustrating the folded display device DD according to an embodiment after the display device DD is dropped. FIG. 5C is a schematic cross-sectional view illustrating a folded display device DD-a according to a comparative example after the display device DD-a is dropped.

Referring to FIG. 5A, the display device DD may be bent about the folding axis FX. In case that the display device DD is bent, the first sub-support layer S-SL1 and the second sub-support layer S-SL2 may face each other. The first sub-support layer S-SL1 and the second sub-support layer S-SL2 may include the first opening group OPG1 and the second opening group OPG2, respectively, and thus damage and distortion of the support layer SL, which occur when the display device DD falls while being bent, may be reduced.

Figure 5B:
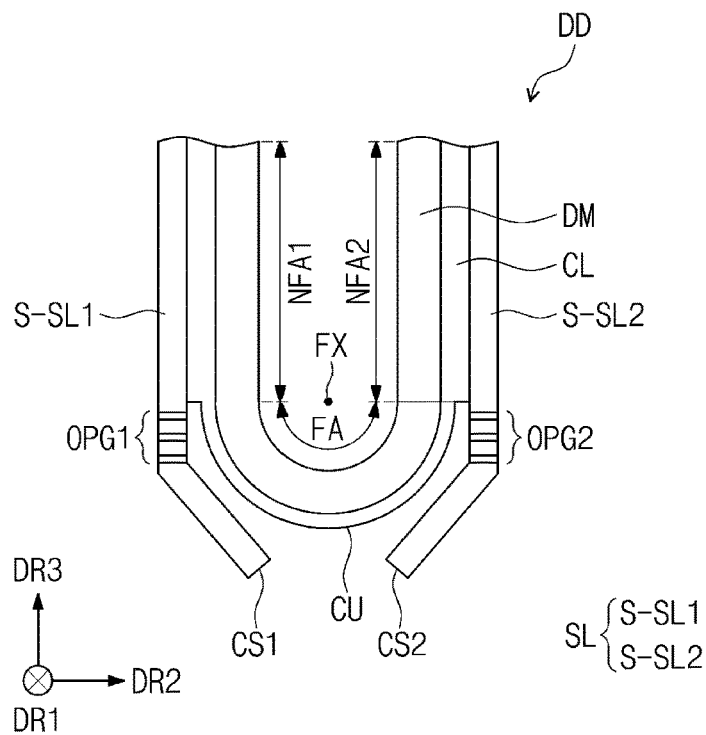
FIG. 5B is a schematic cross-sectional view illustrating a folded display device according to an embodiment of the disclosure.
Figure 5C:
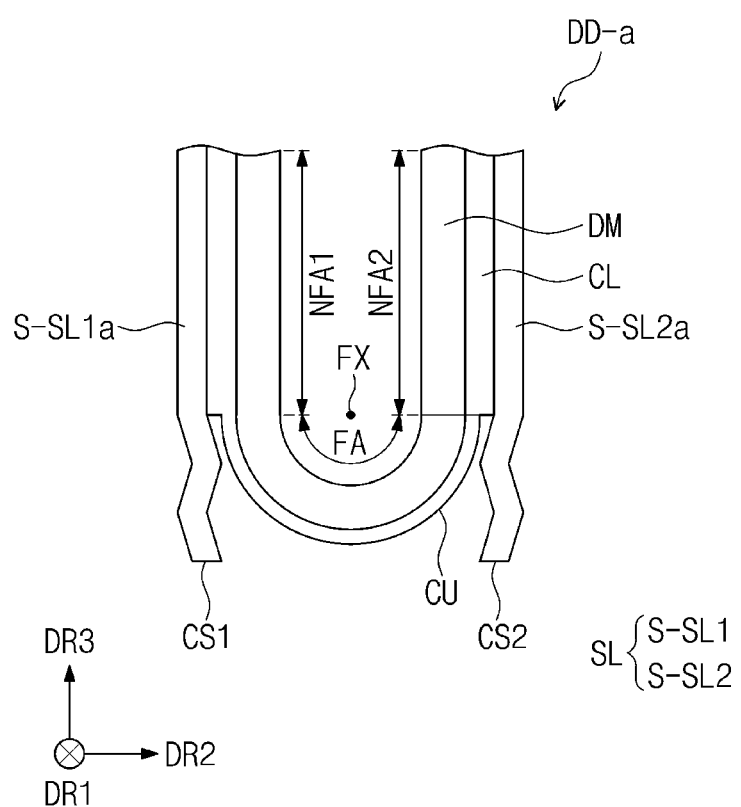
FIG. 5C is a schematic cross-sectional view illustrating a folded display device according to a comparative example.

Referring to FIG. 5B, since the first sub-support layer S-SL1 and the second sub-support layer S-SL2 include the opening groups OPG1 and OPG2 that absorb external impacts, the support layer SL may be prevented from being distorted by the external impacts even though the display device DD falls while being in a folded state. In case that the external impacts are applied, the opening groups OPG1 and OPG2 of the first and second sub-support layers S-SL1 and S-SL2 may absorb the external impacts, and the first and second sub-support layers S-SL1 and S-SL2 may respectively form inclined surfaces such that the first and second cross-section surfaces CS1 and CS2 respectively formed in the first and second sub-support layers S-SL1 and S-SL2 face the folding axis FX, thereby preventing the support layer SL from being distorted.

Referring to FIG. 5C, in case that the display device DD-a according to the comparative example falls while being in a folded state, external impacts are directly applied to sub-support layers S-SL1a and S-SL2a since openings absorbing the external impacts are not defined in the sub-support layers S-SL1a and S-SL2a, and as a result, the sub-support layers S-SL1a and S-SL2a are distorted.

Figure 6:
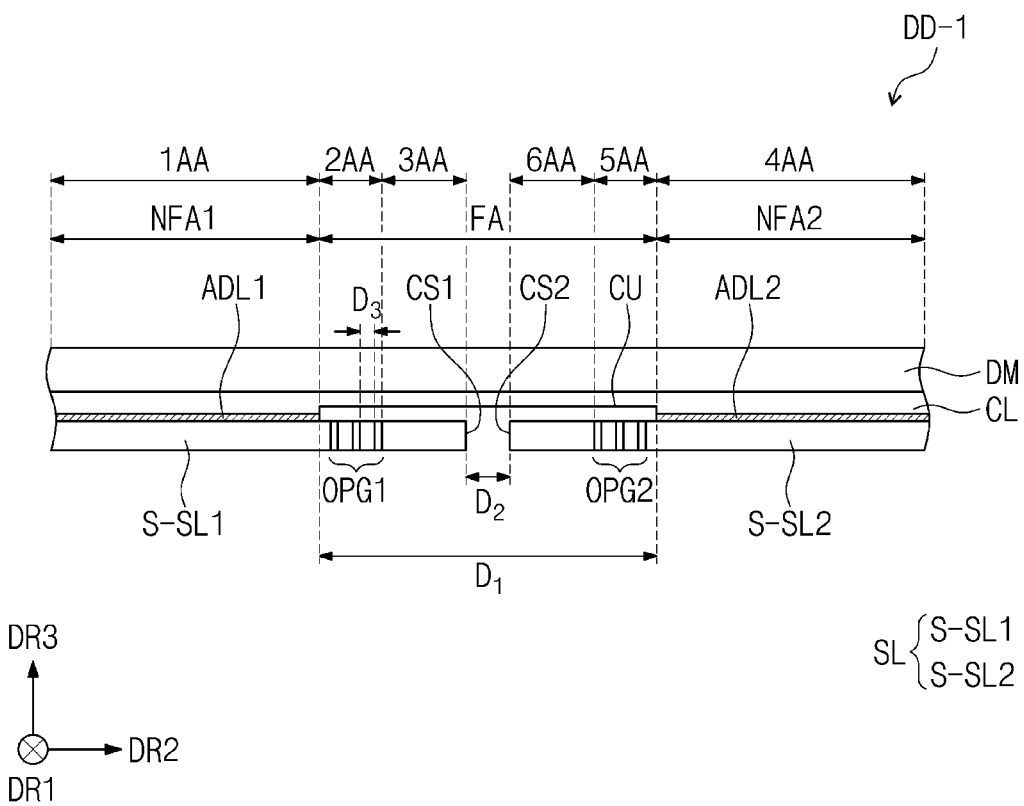
FIG. 6 is a schematic cross-sectional view illustrating a display device according to an embodiment of the disclosure.

FIG. 6 is a schematic cross-sectional view illustrating a display device DD-1 according to an embodiment. Hereinafter, the display device DD-1 will be described in detail with reference to FIG. 6. In FIG. 6, the same descriptions as those of FIGS. 1A to 5C will be omitted, and different features from those of the display device DD described with reference to FIGS. 1A to 5C will be mainly described.

Referring to FIG. 6, the display device DD-1 according to the embodiment may further include a first adhesive layer ADL1 and a second adhesive layer ADL2, which are disposed between the impact absorbing layer CL and the support layer SL. The first adhesive layer ADL1 and the second adhesive layer ADL2 may include a ductile adhesive. The first adhesive layer ADL1 and the second adhesive layer ADL2 may attach the impact absorbing layer CL to the support layer SL.

The first adhesive layer ADL1 may overlap the first sub-support layer S-SL1, and the second adhesive layer ADL2 may overlap the second sub-support layer S-SL2. The first adhesive layer ADL1 and the second adhesive layer ADL2 may be spaced apart from each other by a first width $D_1$ in the second direction DR2, but the disclosure is not limited thereto or thereby. The first adhesive layer ADL1 and the second adhesive layer ADL2 may be a continuous integral adhesive layer or may be filled in the concave portion CU formed in the impact absorbing layer CL.

Figure 7:
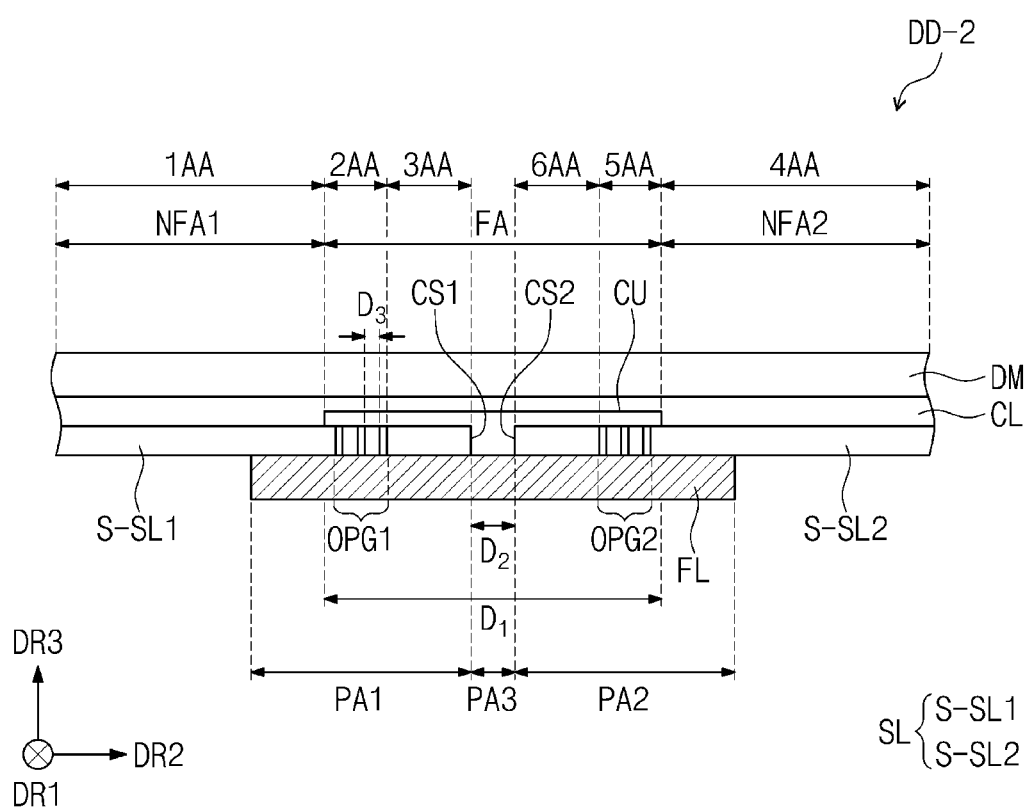
FIG. 7 is a schematic cross-sectional view illustrating a display device according to an embodiment of the disclosure.
Figure 8A:
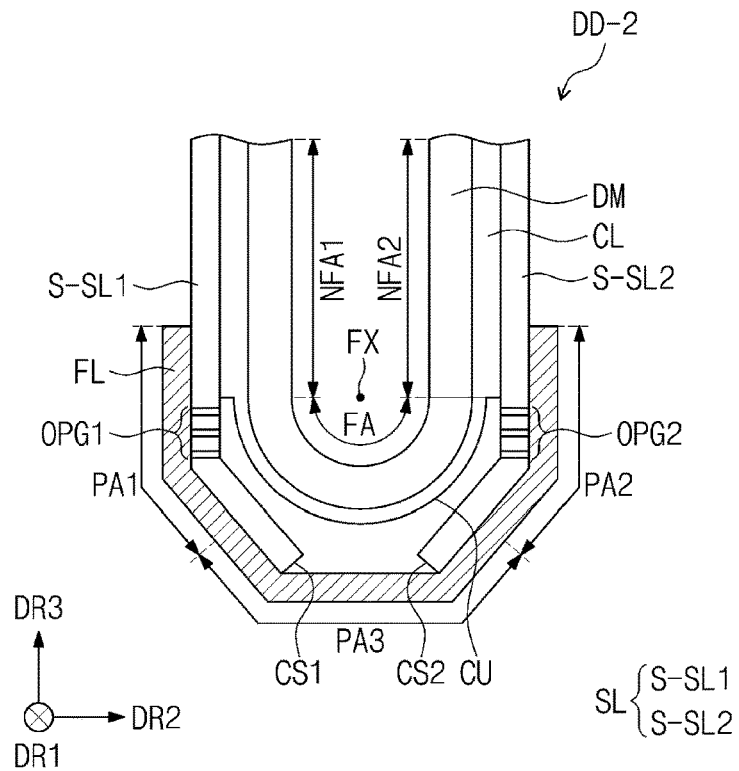
FIG. 8A is a schematic cross-sectional view illustrating a folded display device according to an embodiment of the disclosure.
Figure 8B:
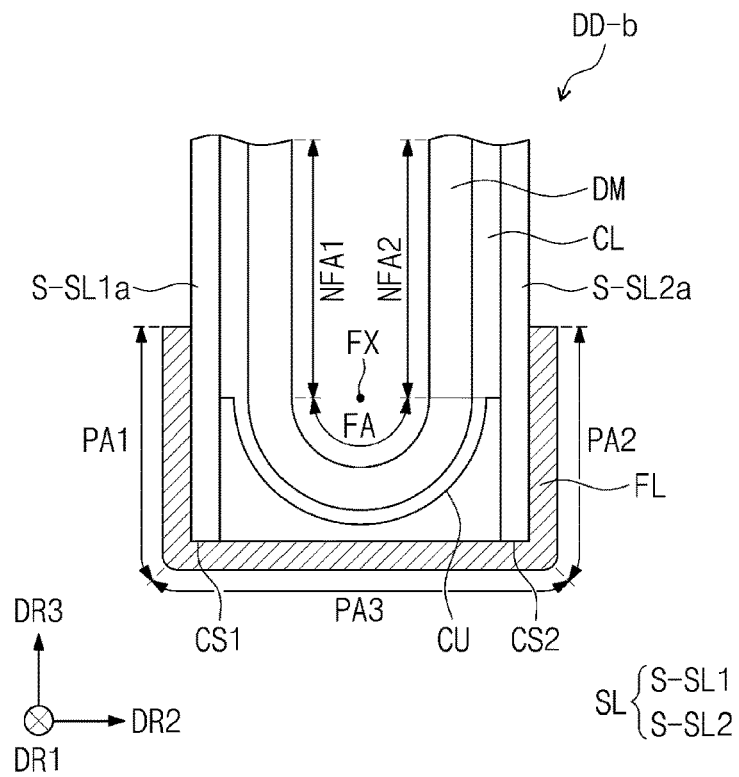
FIG. 8B is a schematic cross-sectional view illustrating a folded display device according to a comparative example.

FIG. 7 is a schematic cross-sectional view illustrating a display device DD-2 according to an embodiment. FIG. 8A is a schematic cross-sectional view illustrating the folded display device DD-2 after the folded display device DD-2 is dropped according to an embodiment, and FIG. 8B is a cross-sectional view illustrating a folded display device DD-b according to an embodiment. Hereinafter, the display devices DD-2 and DD-b according to the embodiments will be described in detail with reference to FIGS. 7 to 8B. The same descriptions as those of FIGS. 1A to 5C will be omitted, and different features from those of the display device DD described with reference to FIGS. 1A to 5C will be mainly described.

Referring to FIG. 7, the display device DD-2 may further include a filter layer FL under the support layer SL. The filter layer FL may prevent foreign substances from entering the folding area FA. The filter layer FL disposed under the support layer SL may entirely overlap the concave portion CU and may overlap a portion of the support layer SL. The filter layer FL may include a first portion PA1 overlapping the first sub-support layer S-SL1, a second portion PA2 overlapping the second sub-support layer S-SL2, and a third portion PA3 connecting the first portion PA1 and the second portion PA2 to each other.

Referring to FIG. 8A, while the display device DD-2 is bent, the first portion PA1 and the second portion PA2 may face each other, and the third portion PA3 may extend to connect the first portion PA1 to the second portion PA2. The display device DD-2 in a folded state may include a space surrounded by the third portion PA3, the first sub-support layer S-SL1, the second sub-support layer S-SL2, and the impact absorbing layer CL.

In case that the display device DD-2 falls while being bent, a portion of the first portion PA1 and a portion of the second portion PA2, and a portion of the third portion PA3 may form an inclined surface toward the folding axis FX. As the inclined surface is formed, the extension of the filter layer FL may be smaller than that of the display device DD-b (refer to FIG. 8B) of the embodiment. For example, as the opening groups OPG1 and OPG2 are defined in the first and second sub-support layers S-SL1 and S-SL2, a repulsive force caused by the extension of the filter layer FL may be reduced, and thus, it is possible to reduce flexural deformation of the filter layer FL and reliability risk of the filter layer FL.

Referring to FIG. 8B, openings are not defined in sub-support layers S-SL1a and S-SL2a of the display device DD-b according to the comparative example. Accordingly, the sub-support layers S-SL1a and S-SL2a may not form an inclined surface toward the concave portion CU, and as a result, the deformation of the filter layer FL and the reliability risk of the filter layer FL may increase due to the repulsive force caused by the excessive extension of the filter layer FL.

Figure 9:
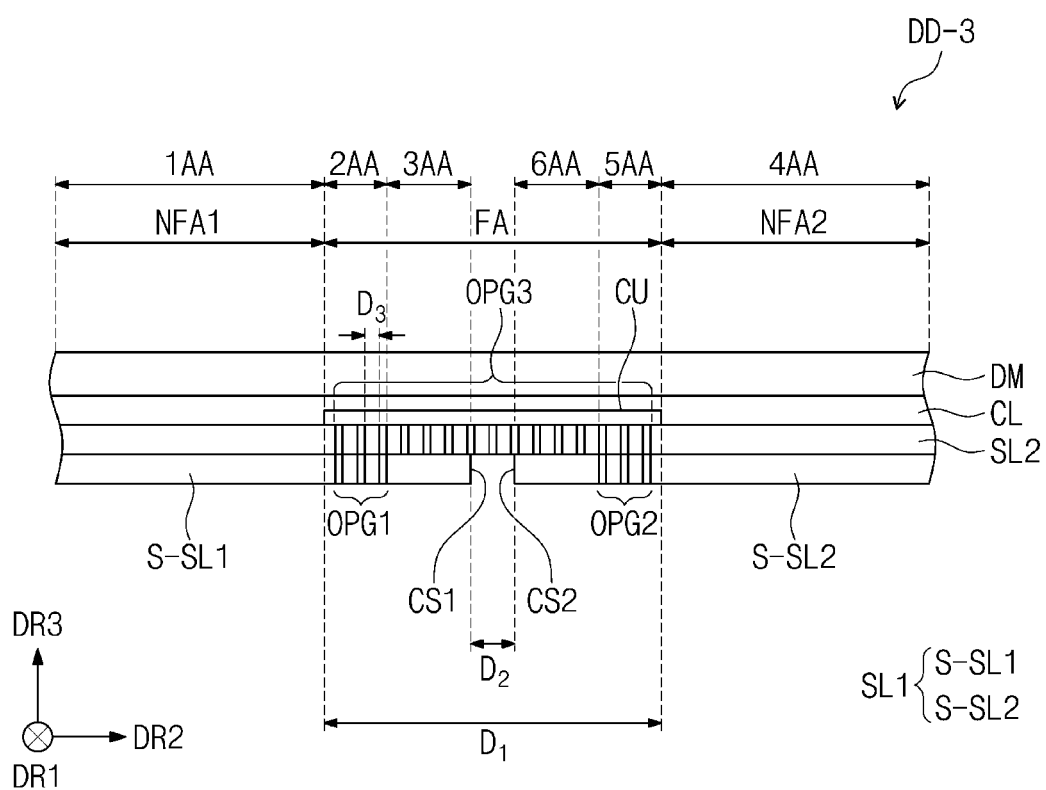
FIG. 9 is a schematic cross-sectional view illustrating a display device according to an embodiment of the disclosure.

FIG. 9 is a schematic cross-sectional view illustrating a display device DD-3 according to an embodiment. Hereinafter, the display device DD-3 will be described in detail with reference to FIG. 9. In FIG. 9, the same descriptions as those of FIGS. 1A to 5C will be omitted, and different features from those of the display device DD described with reference to FIGS. 1A to 5C will be mainly described.

The display device DD-3 according to the embodiment may further include an auxiliary support layer SL2 disposed on a support layer SL1. The auxiliary support layer SL2 may entirely overlap a concave portion CU. A third opening group OPG3 may be defined through the auxiliary support layer SL2 in an area in which the auxiliary support layer SL2 overlaps the concave portion CU.

The third opening group OPG3 may include third sub-opening groups (not shown) spaced apart from each other in the second direction DR2. The third sub-opening groups may be spaced apart from each other at regular or different intervals in the second direction DR2. Each of the third sub-opening groups may include third openings (not shown) spaced apart from each other in the first direction DR1. Each third opening may have a rectangular shape whose long sides are parallel to the first direction DR1, however, this is merely an example, and the disclosure is not limited thereto or thereby. Although not shown in figures, each third opening may have a shape with a curved part. In detail, each third opening may have an oval shape in which sides in the first direction DR1 may be straight and sides in the second direction DR2 may be curved. However, the shape of the third opening should not be particularly limited as long as the external impacts are reduced.

Figure 10:
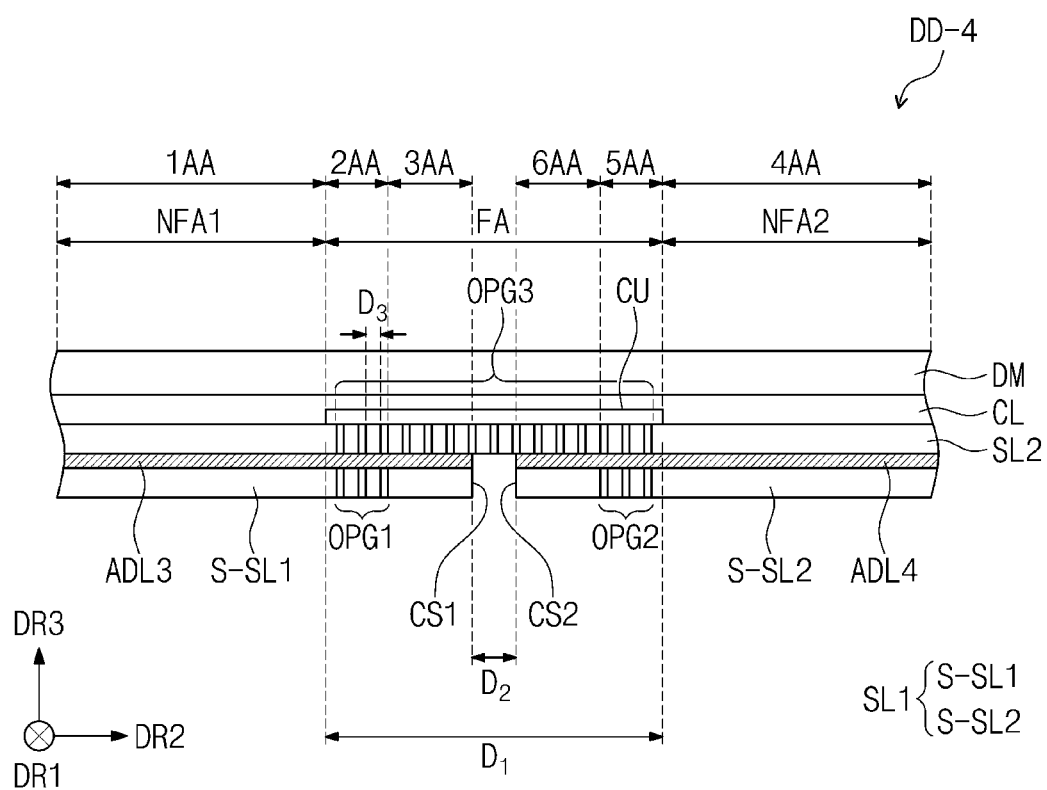
FIG. 10 is a schematic cross-sectional view illustrating a display device according to an embodiment of the disclosure.

FIG. 10 is a schematic cross-sectional view illustrating a display device DD-4 according to an embodiment. Hereinafter, the display device DD-4 will be described in detail with reference to FIG. 10. In FIG. 10, the same descriptions as those of FIGS. 1A to 5C will be omitted, and different features from those of the display device DD described with reference to FIGS. 1A to 5C will be mainly described.

Referring to FIG. 10, the display device DD-4 may further include adhesive layers ADL3 and ADL4 disposed between a support layer SL1 and an auxiliary support layer SL2. The adhesive layers ADL3 and ADL4 may include a ductile adhesive. The adhesive layers ADL3 and ADL4 may attach the support layer SL1 to the auxiliary support layer SL2.

The adhesive layers ADL3 and ADL4 may include a third adhesive layer ADL3 overlapping a first sub-support layer S-SL1 and a fourth adhesive layer ADL4 overlapping a second sub-support layer S-SL2. The third adhesive layer ADL3 and the fourth adhesive layer ADL4 may be spaced apart from each other by a second width D2 in the second direction DR2, but the disclosure is not limited thereto or thereby. The third adhesive layer ADL3 and the fourth adhesive layer ADL4 may be a continuous adhesive layer and may fill in a space defined by the first sub-support layer S-SL1 and the second sub-support layer S-SL2 spaced apart from the first sub-support layer S-SL1.

The display device according to the embodiment may include the support layer through which the opening group is partially defined, and thus, the sagging of the display module and the impact absorbing layer, which are disposed above the support layer, and the distortion of the support layer due to the external impact may be prevented.

Although the embodiments of the disclosure have been described, it is understood that the disclosure should not be limited to these embodiments but various changes and modifications can be made by one ordinary skilled in the art within the spirit and scope of the disclosure as hereinafter claimed. Therefore, the disclosed subject matter should not be limited to any single embodiment described herein, and the scope of the claimed invention shall be determined according to the attached claims.

What is claimed is:

1. A display device comprising:
a display module comprising:
a folding area foldable with respect to a folding axis extending in a first direction;
a first non-folding area disposed adjacent to a side of the folding area; and
a second non-folding area disposed adjacent to another side of the folding area;
an impact absorbing layer disposed under the display module, the impact absorbing layer comprising:
a bending area overlapping the folding area;
a first non-bending area overlapping the first non-folding area;
a second non-bending area overlapping the second non-folding area; and
a concave portion to correspond to the bending area; and
a support layer disposed under the impact absorbing layer, the support layer comprising:
a first sub-support layer overlapping the first non-folding area; and
a second sub-support layer spaced apart from the first sub-support layer in a second direction substantially perpendicular to the first direction, and overlapping the second non-folding area, wherein
the first sub-support layer comprises a first opening group formed through the first sub-support layer and spaced apart from a first cross-section surface adjacent to the second sub-support layer in a direction opposite to the second direction, and
the second sub-support layer comprises a second opening group formed through the second sub-support layer and spaced apart from a second cross-section surface adjacent to the first sub-support layer in the second direction.

2. The display device of claim 1, wherein
the concave portion has a first width in the second direction, and
the first sub-support layer and the second sub-support layer are spaced apart by a second width smaller than the first width in the second direction.

3. The display device of claim 1, wherein the first sub-support layer and the second sub-support layer are symmetrical with each other with respect to the folding axis.

4. The display device of claim 1, wherein
the first sub-support layer comprises:
a first area overlapping the first non-folding area;
a second area overlapping the folding area, the second area comprising the first opening group; and
a third area overlapping the folding area and spaced apart from the first area, the second area being disposed between the first and third areas, and
the second sub-support layer comprises:
a fourth area overlapping the second non-folding area;
a fifth area overlapping the folding area, the fifth area comprising the second opening group; and
a sixth area overlapping the folding area and spaced apart from the fourth area, the fifth area being disposed between the fourth and sixth areas.

5. The display device of claim 1, wherein each of the first and second opening groups comprises a plurality of sub-opening groups arranged in the second direction and spaced apart from each other.

6. The display device of claim 5, wherein each of the plurality of sub-opening groups comprises a plurality of openings arranged in the first direction and spaced apart from each other.

7. The display device of claim 6, wherein each of the plurality of openings has a rectangular shape whose long sides are substantially parallel to the first direction in a plan view.

8. The display device of claim 1, wherein the first sub-support layer and the second sub-support layer face each other in case that the display device is folded with respect to the folding axis.

9. The display device of claim 1, further comprising:
a first adhesive layer disposed between the impact absorbing layer and the first sub-support layer; and a second adhesive layer disposed between the impact absorbing layer and the second sub-support layer.

10. The display device of claim 9, wherein the first adhesive layer and the second adhesive layer are spaced apart by the first width in the second direction.

11. The display device of claim 1, further comprising a filter layer disposed under the support layer.

12. The display device of claim 11, wherein the filter layer overlaps an entire surface of the concave portion and overlaps a portion of the first sub-support layer and a portion of the second sub-support layer.

13. The display device of claim 11, wherein the filter layer comprises:
   a first portion overlapping the first sub-support layer;
   a second portion overlapping the second sub-support layer; and
   a third portion connecting the first portion to the second portion.

14. The display device of claim 13, wherein
   the first portion of the filter layer and the second portion of the filter layer face each other in case that the display device is folded with respect to the folding axis, and
   the third portion extends to connect the first portion to the second portion.

15. The display device of claim 1, further comprising an auxiliary support layer disposed on the support layer, wherein
   the auxiliary support layer overlaps an entire surface of the concave portion, and
   the auxiliary support layer comprises a third opening group in an area in which the auxiliary support layer overlaps the concave portion.

16. The display device of claim 15, wherein the third opening group comprises a plurality of third sub-opening groups spaced apart from each other in the second direction.

17. The display device of claim 16, wherein each of the third sub-opening group comprises a plurality of third openings spaced apart from each other in the first direction.

18. The display device of claim 15, further comprising an adhesive layer disposed between the support layer and the auxiliary support layer.

19. The display device of claim 18, wherein the adhesive layer comprises:
   a third adhesive layer overlapping the first sub-support layer; and
   a fourth adhesive layer overlapping the second sub-support layer.

20. The display device of claim 19, wherein the third adhesive layer and the fourth adhesive layer are spaced apart by a second width in the second direction.

* * * * *